United States Patent
Denton

[15] 3,665,374
[45] May 23, 1972

[54] APPLIANCE CORD-CONNECTING STRUCTURE

[72] Inventor: Bryce A. Denton, Ontario, Calif.
[73] Assignee: General Electric Company
[22] Filed: May 28, 1970
[21] Appl. No.: 41,189

Related U.S. Application Data

[63] Continuation-in-part of Ser. No. 886,058, Dec. 18, 1969, abandoned.

[52] U.S. Cl..............................................339/101, 339/107
[51] Int. Cl....................................H01r 13/56, H01r 13/58
[58] Field of Search..................339/101, 102, 107, 105, 103

[56] References Cited

UNITED STATES PATENTS 2,106,248  1/1938  Hedlund..............................339/101 X

FOREIGN PATENTS OR APPLICATIONS 383,839  11/1932  Great Britain..........................339/101
885,718  6/1943  France...................................339/105

*Primary Examiner*—Richard E. Moore
*Attorney*—Lawrence R. Kempton, John F. Cullen, Leonard J. Platt, Frank L. Neuhauser and Oscar B. Waddell

[57] ABSTRACT

The invention discloses a cord-connecting structure for stress relief beyond an appliance envelope using the usual elongated flexible bushing around the cord and anchored to the appliance to prevent sharp cord bends at the appliance. The bushing may have different internal cross sections to conveniently accommodate in part of its length twisted and preferably separated conductors and, in the rest of its length, to help rotationally restrain the cord by the bushing itself or equivalent. Thus, constant flexing of the cord, even with the tough new materials, imposes substantially no or very minimal stresses on the conductors throughout resulting in extremely long life and safer cords.

11 Claims, 5 Drawing Figures

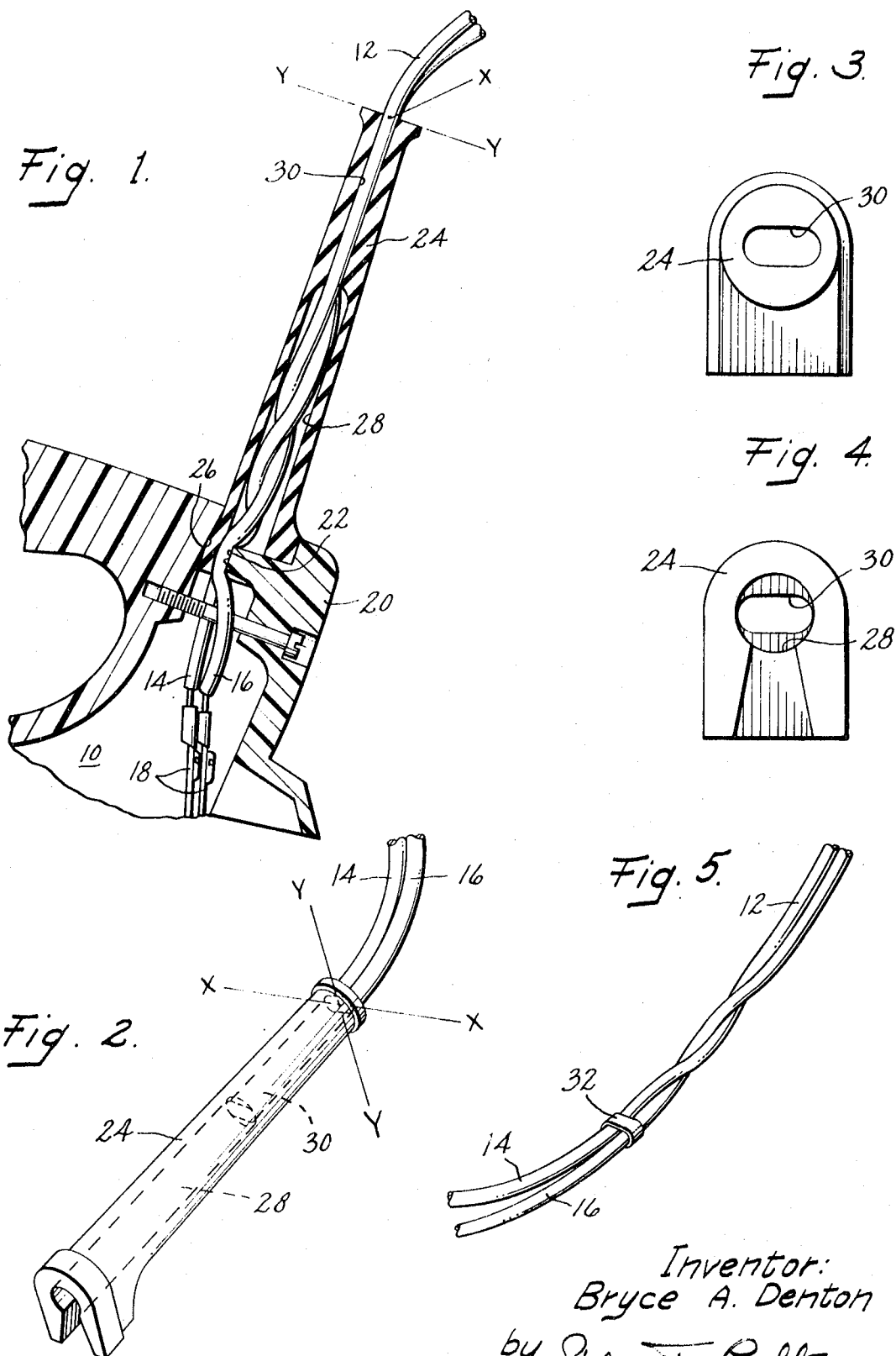

APPLIANCE CORD-CONNECTING STRUCTURE

This is a continuation-in-part of application Ser. No. 886,058 filed Dec. 18, 1969, now abandoned.

BACKGROUND OF THE INVENTION

1. Field of the Invention

The invention discloses an improvement in the connection structure between the electric cord and an appliance whereby the newer and tougher rubbers may be effectively used without abrasion and stressing of the conductors to permit complete flexing over long periods of use for longer life and safer cords.

2. Description of the Prior Art

Many portable electrical appliances used today are cord-operated as opposed to the battery type. The cords are of various materials and, depending on the particular appliance, different amounts of flexing of the cords occur in use. In time, this wears the cord to expose the internal conductors or to break them, both resulting in potentially dangerous shorts. Additionally, some household appliances, such as irons, can subject the cords to high temperatures and consequent burning or charring again setting up a potential danger. Further, it is undesirable to transmit stress or pull from a flexing cord to the appliance terminals for obvious reasons. To overcome this, it is common to provide various forms of strain relief such as knots, clamps, or plates within the appliance to permit slack in the conductors between the appliance exit and the terminals to relieve stress on the terminals. Additionally, in electrical appliances, various parameters must be met to qualify for Underwriter Laboratory approval. While it is desired that the cord last the life of the appliance, it is further desirable that the cord be easily replaceable by the owner and still be as safe as the original equipment. While such cords and requirements vary, depending on the appliance, a typical appliance that subjects the cord to stringent conditions is the electric flatiron and it is to this appliance that the invention is directed although by no means so limited. Traditionally, the cord for supplying current to the heating element of a flatiron has been constructed in a manner known in the industry as heater parallel twisted conductors or better known as HPD heater cord. Essentially, the construction consists of two multi-strand conductors each overlaid with cotton thread followed by uncured rubber and then asbestos fiber. The conductors are twisted together and overlaid with a braided cotton outer layer. This approved cord is flexible, long lived, and slides easily over the material being ironed without marking the cloth and the end connected to the terminals inside the iron withstands the high temperatures involved. The cord does have some disadvantages. If, through negligence, the hot soleplate contacts the outer braid for a short time, the braid is scorched and weakened so that it ultimately breaks exposing the asbestos and uncured rubber to eventually expose the conductors with consequent danger. Failure may occur from constant cord flexing in using the iron with resultant chaffing of the insulation between the two conductors so that the insulation abrades allowing the two conductors to touch one another and arc between the conductors.

A later development of parallel conductor cord as used on appliances is a heater parallel neoprene or better known as HPN heater cord and this consists of two multi-strand conductors, each coated with tin or covered with a layer of material such as cotton thread or paper ribbon which are then coated with an insulating material such as neoprene rubber by extrusion of the rubber and conductors through a die while the conductors are separated so the extruded rubber holds the conductors apart and acts as an insulation between them and provides an outer covering. A flat extrusion may include a connecting web, like the well-known lamp cord, so that conductors are easily rippable to separate them for connection to the terminals. Neoprene covered HPN heater cord has not been suitable for flatirons because it does not slide easily over the material but tends to drag and wrinkle or gather the cloth as the cord is pulled across it. Also, it often leaves marks on the cloth as it is pulled across it during ironing. A recent material that is an improvement on neoprene is chlorosulphonated polyethylene such as is available under the name "Hypalon." This has the advantage of sliding easily over the cloth and it does not mark the cloth. Also, it has the extremely tough coating as well as being more resistant to high temperatures than neoprene. Consequently, a hot iron can be placed on such a cord for several minutes without damaging it. Because of the toughness of this particular polyethylene material, if conductors fail from constant flexing they simply open circuit with no arcing because the fine multi-strand conductors cannot penetrate the coating.

Tests of such cords on irons, however, have shown several early failures. It appears that the failures are the result of the parallel conductor cord being quite flexible over its short axis but not flexible in the direction of its long axis. Consequently, when it is forceably flexed over its long axis, as occurs during movement of an iron, one conductor, including its individual strands, is in tension and the other is in compression. The many strands of the conductor under compression tend to "-mushroom" within the wire coating or tube resulting in a sharp bend and they break causing an open circuit failure. They cannot penetrate the tough coating to cause a direct short and arcing but the iron is out of commission. In any appliance, these failures will occur at the point where the flexing is greatest. In the flatiron, this usually occurs just above the point where the cord is tightly compressed between two parts generally in the iron handle. The compressing or clamping is one conventional strain relief to prevent any pull on the cord being transmitted to the terminals. Generally, the cord exits from the iron just above this strain relief through a protective bushing to prevent sharp cord bends and it is this point that is constantly flexed to put the individual wires under the constantly changing tension-compression stresses and eventual breakage. Inability to correct this defect has prevented the use of the improved tougher and more heat-resistant rubber.

SUMMARY OF THE INVENTION

Briefly described, the invention is directed to an appliance, such as a flatiron, that has an electric cord secured to terminals within the iron by a portion of the cord that has separated conductors to conduct electric power to the iron. In this appliance, an improvement is provided in the cord-iron connection that uses an elongated flexible sleeve bushing surrounding the cord and anchored to the iron at one end to prevent sharp cord bends at the iron. The cord may be any shape but is conveniently a flat two-wire parallel cord and, in one of the new materials, has a molded chlorosulphonated polyethylene covering over the conductors which is formed to rippably separate the conductors. The flexible bushing preferably has lengths of different internal cross sections around the cord. The separated conductor portion of the cord that connects to the terminals may be continued to extend outside the iron envelope into a selected length of the bushing which length has an internal cross section larger than the cord or an unseparated portion may extend into the bushing. When separated, each separated conductor is twisted lengthwise at least partially around its adjacent conductor and the twisted conductors are held twisted and are disposed in the bushing length that has the larger cross section. If unseparated, the cord is turned to twist the conductors at least one-quarter twist or 90° in the bushing length. The remainder of the bushing length may have an internal cross section that conforms to the cross section of the unripped cord, such as the flat cord, and rotationally restrains the cord or separate means may prevent the cord from untwisting. A strain relief means for compressing the conductors between the terminals and the twisted conductors is provided. With this improved connection structure, very minimum or substantially no stress is imposed on the conductors at the terminals or in the bushing during continuous flexing. Thus, the main object is to provide an improved cord-appliance connection that substantially prevents any stress on the conductors and which provides long life under constant flexing even when using the tough high temperature coatings available.

BRIEF DESCRIPTION OF THE DRAWINGS

FIG. 1 is a partial cross-sectional view of the preferred improved cord connection structure as used on an appliance such as an iron;

FIG. 2 is a perspective view of the flexible bushing with the different internal cross sections shown dotted with a partial cord bending in its flexible direction;

FIG. 3 is an end view of the bushing showing the rotationally restraining cord portion;

FIG. 4 is an end view of the bushing where anchored to the appliance and showing the twisted end portion; and FIG. 5 is a partial smaller perspective view of a modified separated conductor cord with a twist retaining means.

DESCRIPTION OF THE PREFERRED EMBODIMENT

The invention is applicable to any cord-connected appliance but is specifically applicable to an electric flatiron and will be described in connection therewith. Also it is applicable to any cord using plural conductors such as those using a grounding conductor or the more common dual conductor cord and the invention is described in connection with the latter but is not so limited as will be apparent.

Referring first to FIG. 1, there is shown an electric flatiron handle 10 from which the usual cord 12 extends. As shown, the cord extends out of the top of the handle at the rear thereof for convenient use by a right- or left-handed operator although it can extend from the sides in a well-known manner and the invention is applicable to any such connection. After entering the handle, to connect to the iron, the cord has a portion generally separated into plural such as two conductors 14 and 16 and the individual conductors are connected to terminals 18. To prevent any strain from pulling on the cord being transmitted to the terminals 18, it is customary to provide a strain relief means of some form. Typically, such a relief may consist of rear cover 20 which is formed with a projecting toothed tongue 22 to "bite" or compress the conductors against the iron and provide slack between tongue 22 and terminals 18. Other forms of stress relief may use suitable clamps as shown at 39 in U.S. Pat. No. 2,727,322 or a strain relief plate as shown at 74 in U.S. Pat. No. 2,602,248 both of common assignment. It is common in such irons to provide an elongated flexible sleeve bushing 24 that surrounds the cord and is anchored to the iron at one end by means, such as formed lips 26, better seen in FIG. 2 that engage under a matching overhead in the handle. The bushing extends out sufficiently far to prevent any sharp cord bends at the iron and the strain relief means acting on the conductors is generally disposed between the anchor and terminals all as well-known in the art.

The use of the newer improved materials, such as chlorosulphonated polyethylene or other materials with similar characteristics, which are extruded directly over the conductors and formed to be rippable, has presented problems because of the constant flexing required in an iron. In parallel conductor cords, whether round, or of the better known flat wire type, it will be apparent that the cord is flexible over its short axis $x—x$ meaning that it bends quite easily across its narrow dimension as shown in FIG. 2 but it is much more inflexible to bending about its right angle axis $y—y$ or wide dimension. Bending about $y—y$ strains the individual wires putting them under tension and compression with the compression "mushrooming" the wires and breaking them. Fortunately, because of the toughness of the molded cord covering, any breakage that does occur in the wires from this action results only in an open circuit since the wires cannot penetrate the covering, however, the appliance is out of commission. Thus, it is necessary to remove the tension and compression that occur in the individual wires of the conductors so that any amount of flexing does not break the individual wires. To this end, the preferred form of the invention provides a formed bushing 24 with different internal cross sections to neutralize the tension and compression stresses. As shown, bushing 24 is provided with a selected length 28 of generally one internal cross section that, as shown in FIG. 1, practically is larger than the cross section of cord 12 to form an enlarged cavity. The remaining length 30 of the busing is formed to have a length that has a cross section conforming to the cross section of the cord regardless of the cord shape.

It has been found that breakage due to flexing can be minimized or substantially eliminated by twisting the conductors and holding them twisted within the bushing. This may be accomplished either by winding or turning the entire cord lengthwise at least one-quarter turn or 90° as shown at the top of FIG. 1 but putting the twist entirely within the bushing or by rippably separating the two conductors and twisting them around one another at least 90° within the bushing as shown at 28 and holding the cord to prevent unwinding. Practically, the latter is preferred and it is in this manner that the invention will be described as the best mode although it will be appreciated that separating the conductors is not absolutely essential, merely that the conductors be twisted and held.

To neutralize the compression and tension stresses of the individual wires, the separated conductors are extended back a sufficient distance to permit each conductor to be twisted lengthwise within the larger bushing cross section as shown in FIG. 1 and mostly outside the iron envelope. This twisting is a minimum of 90° and, in actual practice, preferably at least once around the adjacent conductor for one complete 360° turn as shown in the preferred embodiment of FIG. 1. Naturally, further twists, while not required, may be used. Since the separated or rippable cord conductors, when twisted, occupy more cross-sectional area than the untwisted portion, the cavity over the selected length 28 is made to accommodate the twisted conductors. It will be seen that the twisting of the conductors whether separated or not places a given wire within the conductor under alternate tension and compression whereby the twisting effectively cancels or neutralizes the stresses so the individual wires are not stressed. Technically, it is impossible to bend without stress that, in time, e.g., a million cycles, could take a toll. However, within a long product lifetime, any stress is completely minimal and there is practically no stress and this is what is intended as used herein. Consequently, the cord may be flexed in any direction without placing the individual wires of the conductors under any stress. As shown in FIG. 4, the selected length 28 may be conveniently formed round although any size or shape will suffice that accommodates the twisted conductors and, in the preferred embodiment as shown, this, as a practical matter, results in a larger cross section over the selected length although a molded cavity to accommodate the twisted conductors could be formed. The remaining length 30 of bushing 26 is made to have an internal cross section that conforms to the wire cross section as shown in FIG. 3. It is merely necessary that this cross section in the bushing conform to the unripped parallel conductor cord so that it provides a length and thus a means connected to the cord that both prevents the twisted section from becoming untwisted and rotationally restrains the cord therein by pressing against the wide dimensions or effectively on the parallel conductors, for example, lamp-type or non-round cord would be pressed on the wide portion to prevent turning. When using a substantially flat cross section 30 as shown, the cord, as it exits from bushing 26, which can be of the same tough material, inherently tends to bend about its flexible axis $x—x$ as shown in FIG. 2, but since this is over a long radius no stresses or strains are put on the individual wires and no breakage occurs at this point. Similarly, any other cross section naturally permits the cord to assume its flexible bending position about its $x—x$ axis or narrowest dimension beyond the bushing and no stress is applied to the wires. With the pressing action on the remaining bushing length 30 acting in conjunction with the selected length 28 to prevent turning and hold the twisted portion of the conductors therein, there is no destructive stress applied to the individual conductors due to any bending about the inflexible axis y—y back in the bushing. The parts are easily assembled by passing the cord through the bushing from the anchor end and pulling the twisted portion into the bushing. Also, this assembly may be sold as an easily-installed replacement.

To ensure the minimum 90° twist in assembly, the bushing can be molded to require the twist such as by making length 30 at 90° to the lay of the cord as it comes from terminals 18. This merely means that the section shown in FIG. 3 would be rotated 90° so that the oblong opening shown as 30 would be vertical and the function is identical. However, this is an manufacturing assembly precaution and is not really necessary. Further, while portion 30 is preferred it will be apparent that, once assembled, tongue 22 effectively connects on the cord to prevent untwisting in the bushing of the separated conductors when the tough material is used and portion 30 may merely serve as a "filler" so the cord exit from the bushing is esthetically pleasing.

As shown in FIG. 5 an alternate form may be used to restrain the cord from untwisting when the conductors are separated if bushing portion 30 is not relied on. This form is desirable when the cord is supplied as a replacement cord to ensure that it is properly twisted when installed. To this end the cord 12 is turned and separated over a given length as in FIG 1 into two conductors that are then twisted lengthwise a minimum of 90° and preferably once around the adjacent conductor as seen in FIG. 5. The separated conductors are held in the twisted position by any suitable clamping means 32 that is connected to the cord as by pinching around the conductors. This assembly may be placed in a bushing like that of FIG. 2 whereupon cavity 28 may even be substantially the full length of the bushing, i.e., selected length portion 30 may be shorter merely to act as a filler or close the end at the cord exit for good appearance. The primary restraining force against rotation in the bushing is by clamp 32. Also, the assembly may be sold as a replacement cord that can only be installed properly since it has a fixed twist because of the clamp.

The use of the elongated bushing with the two internal cross sections providing a pressing and rotationally restraining action in the combination with the twisted cord portion or the twisted conductors with the separate restraining clamp means both with the normal strain relief means thus results in complete cord flexibility in all directions. Especially when used with the tough impenetrable rubber that prevents arcing, the improvement results in a durable long life cord that outlasts a standard cord with no danger of short circuiting.

While there have been described preferred forms of the invention, obvious equivalent variations are possible in light of the above teachings. It is therefore to be understood that within the scope of the appended claims the invention may be practised, otherwise than as specifically described, and the claims are intended to cover such equivalent variations.

I claim:

1. In a portable appliance with an electric cord connected to terminals within the appliance by a portion of the cord having separated conductors to conduct power to the appliance, the improvement in the cord-appliance connection comprising;

an elongated flexible sleeve bushing surrounding said cord and anchored to the appliance preventing sharp cord bends at the appliance, said cord extending into a selected length of the bushing and being turned to provide twisted conductors therein at least 90° lengthwise, strain relief means between the bushing anchor and terminals acting on the conductors, a cavity in said bushing over said selected length to accommodate the twisted conductors, and means rotationally restraining said conductors from untwisting, whereby minimal stress is imposed on said conductors at said terminals or at said bushing during flexing.

2. Apparatus as described in claim 1 wherein the rotationally restraining connecting means is disposed within said bushing.

3. Apparatus as described in claim 1 wherein said bushing has a length beyond said selected length with an opening therethrough conforming to the cross section of and rotationally restraining said cord.

4. Apparatus as described in claim 3 wherein said cord is a parallel non-round conductor cord with the cross section pressing on said parallel conductors and said separated conductor portion extends into said selected bushing length.

5. Apparatus as described in claim 1 wherein the cord covering over said conductors is a chlorosulphonated polyethylene that is molded over said conductors and is formed to rippably separate said conductors.

6. Apparatus as described in claim 4 wherein the cord is a flat wire cord flexible to bending across its narrow dimension and resistant across its wide dimension.

7. In a flatiron with an electric cord secured to terminals within the iron by a portion of the cord having separated conductors to conduct power to the iron, the improvement in the cord-iron connection comprising;

an elongated flexible sleeve bushing surrounding said cord and anchored to the iron at one end thereof preventing sharp cord bends at the iron, said bushing having lengths of different internal cross sections about said cord, said separated conductor portion of said cord extending into a selected length of said bushing having an internal cross section larger than said cord, each conductor being twisted lengthwise at least 90° lengthwise around the adjacent conductor, means between the twisted conductors and terminals to compress the separated conductors against the iron, the twisted conductors being disposed in said selected bushing length, the remainder of said bushing length having an internal cross section conforming to the cross section of and rotationally restraining said cord, whereby no stress is imposed on said conductors at said terminals or in said bushing during flexing.

8. Apparatus as described in claim 7 wherein said cord is a parallel non-round conductor cord with the bushing cross section pressing on said parallel conductors.

9. Apparatus as described in claim 7 wherein the cord covering over said conductors is a chlorosulphonated polyethylene that is molded over said conductors and is formed to rippably separate said conductors.

10. Apparatus as described in claim 8 wherein the cord is a flat wire cord flexible to bending across its narrow dimension and resistant across its wide dimension.

11. Apparatus as described in claim 10 wherein said internal cross section adjacent said bushing anchor is substantially round and the remaining internal bushing cross section under said pressed cross section is substantially flat.

* * * * *